United States Patent [19]

Nysen

[11] Patent Number: 4,737,789
[45] Date of Patent: Apr. 12, 1988

[54] INDUCTIVE ANTENNA COUPLING FOR A SURFACE ACOUSTIC WAVE TRANSPONDER

[75] Inventor: Paul A. Nysen, Sunnyvale, Calif.

[73] Assignee: X Cyte, Inc., Mountain View, Calif.

[21] Appl. No.: 936,892

[22] Filed: Dec. 2, 1986

[51] Int. Cl.[4] .............................................. G01S 13/74
[52] U.S. Cl. ......................................... 342/51; 342/50
[58] Field of Search ............................. 342/44, 50, 51

[56] References Cited

U.S. PATENT DOCUMENTS

| | | | |
|---|---|---|---|
| 3,706,904 | 12/1972 | Cole et al. | 342/51 X |
| 3,981,011 | 9/1976 | Bell | 342/51 X |
| 4,059,831 | 11/1977 | Epstein | 342/51 X |
| 4,069,472 | 1/1978 | Kamata et al. | 342/44 |
| 4,096,477 | 6/1978 | Epstein et al. | 342/51 X |
| 4,242,671 | 12/1980 | Plows | 342/187 X |
| 4,458,235 | 7/1984 | Ohyama | 342/44 |

Primary Examiner—T. H. Tubbesing
Attorney, Agent, or Firm—Karl F. Milde, Jr.

[57] ABSTRACT

An arrangement is disclosed for coupling electrical energy into and/or out of a surface acoustic wave (SAW) device, such as a transponder. The SAW device has two input/output terminals electrically connected to at least one transducer for converting between electrical energy and SAW energy. Such transducer presents to the terminals a prescribed capacitance in the frequency range of operation. An inductive loop, formed by at least one turn of an electrical conductor, is connected to the two input/output terminals of the SAW device. The inductance of the loop is made substantially equal to the prescribed capacitance at the frequency range of operation, thus forming a resonant circuit with the SAW device. The loop also forms a protective DC short circuit across the two terminals, preventing build-up of static electricity. The inductive loop is inductively coupled to an antenna capable of receiving and/or transmitting radiation in the frequency range of operation.

15 Claims, 8 Drawing Sheets

INDUCTIVE ANTENNA COUPLING FOR A SURFACE ACOUSTIC WAVE TRANSPONDER

CROSS-REFERENCE TO RELATED APPLICATIONS

The present application is related in subject matter to the following commonly-owned applications for patent:

Application Ser. No. 793,703 filed Oct. 31, 1985 of Cin L. Smith and Donald Armstrong for "INTEGRATED CIRCUIT PACKAGE ASSEMBLY AND METHOD FOR MAKING THE SAME".

Application Ser. No. 793,704 filed Oct. 31, 1985, now U.S. Pat. No. 4,703,327 of Anthony J. Rossetti and Paul A. Nysen for "INTERROGATOR/RECEIVER SYSTEM FOR USE WITH A REMOTE TRANSPONDER".

Application Ser. No. 835,616 filed Mar. 6, 1986 of Halvor Skeie and Donald Armstrong for "PASSIVE INTERROGATOR LABEL SYSTEM WITH A SURFACE ACOUSTIC WAVE TRANSPONDER OPERATING AT ITS THIRD HARMONIC AND HAVING INCREASED BANDWIDTH".

BACKGROUND OF THE INVENTION

The present invention relates to apparatus for coupling electrical energy into and/or out of a surface acoustic wave ("SAW") device. More particularly, the present invention relates to apparatus for coupling energy into and out of a SAW device which serves as a transponder in a "passive interrogator label system".

A "passive interrogator label system", so called, is a radar system utilizing transponders which are capable of receiving an interrogating first signal, processing this signal and transmitting a second signal in reply that is derived from the first signal and contains encoded information. Because the encoded information normally includes an identification code which is unique to each transponder, and because the transponders of such a system are relatively light weight and small and may be easily attached to other objects to be identified, the transponders are sometimes referred to as "labels". Furthermore, the transponders, which may be implemented by SAW devices, carry no self-contained power source, such as a battery, that must be periodically replaced. Consequently, these transponders are "passive"; hence the name "passive interrogator label system".

Passive interrogator label systems of the type to which the present invention relates are disclosed in the following U.S. patents:

| U.S. Pat. No. | Patentee |
| --- | --- |
| 3,273,146 | Horwitz, Jr. |
| 3,706,094 | Cole et al. |
| 3,755,803 | Cole et al. |
| 3,981,011 | Bell |
| 4,058,217 | Vaughan et al. |
| 4,059,831 | Epstein |
| 4,263,595 | Vogel |

Such systems are also disclosed in the commonly-owned patent applications referred to above. In general, a passive interrogator label system includes an "interrogator" for transmitting a first radio frequency signal; at least one passive transponder which receives this first signal, processes it and sends back a second radio frequency signal containing encoded information; and a receiver, normally located next to the interrogator, for receiving the second signal and decoding the transponder-encoded information.

The aforementioned U.S. patent application Ser. No. 793,703 discloses a "package assembly" comprising a SAW device and a dipole antenna electrically connected to two terminals formed by contact pads on the SAW device. The dipole antenna is formed by a metal foil, cut to the proper size and shape and bonded by heat and pressure to a polyethylene coated Mylar sheet. Each individual "pole" or element of the dipole antenna is serpentine shaped.

The antenna characteristics required for this application determine that each pole be approximately 1 inch wide and 1 ½ inches long. With the SAW device placed at the center between the two poles extending in opposite directions, the entire assembly or "label" formed of the SAW device and the antenna is approximately 1 inch wide and 3 inches long.

Whereas this flat, card-like structure is ideal for many applications such as identification badges for personnel, and I.D. tags for automobiles, factory parts or the like, certain applications require that the antenna be shaped or configured differently so as to meet certain performance requirements or to permit the assembly to fit within available space. Consequently, it is necessary to couple the SAW device to a large variety of antenna configurations in a mass production mode. Not only are the requirements for mass production severely impaired by the necessity of connecting the SAW device to one type of antenna or another, but the sensitive, fragile nature of the SAW device itself makes chip handling difficult.

SUMMARY OF THE INVENTION

It is an object of the present invention, therefore, to provide means for coupling a SAW transponder to an antenna of any desired configuration.

It is a further object of the present invention to provide means for coupling a SAW device to an antenna which is particularly amenable to the application of mass production techniques.

These objects, as well as further objects which will become apparent in the discussion that follows, are achieved, according to the present invention, by providing an inductive loop formed by at least one turn of an electrical conductor and having an inductance which is substantially equal to the capacitance presented at the terminals of the SAW device within the given frequency range of operation. The two free ends of the loop are electrically connected to the two terminals of the SAW device so that the loop and the device form a resonant circuit at the given frequency range of operation.

The SAW device and inductive loop thereby form a structural unit which may be mass produced in large quantities. This structural unit may be magnetically coupled to various different types of antenna which are capable of receiving and/or transmitting radiation in the given frequency range.

An additional advantage of the apparatus according to the present invention is that the inductive loop forms a protective D.C. short circuit across the two terminals of the SAW device. This D.C. short prevents the buildup of static electricity across the two terminals which, in the presence of water, can cause corrosion of the metal (aluminum, chromium) layers of the SAW device.

Furthermore, the small inductive loop, so formed, may be conveniently hermetically packaged together with the SAW device in a glass or ceramic envelope. The elimination of the metal interface between the SAW device and the antenna thus opens new options for hermetic, or near-hermetic packaging.

Advantageously, the antenna is formed by a waveguide configured and dimensioned to produce standing waves when excited in the given frequency range of operation. When so excited, the waveguide exhibits alternating "sheet current" on the internal surfaces thereof. If this waveguide includes an open slot at a position which interrupts the surface current, it will transmit or receive radiation in the given frequency range.

For a full understanding of the present invention, reference should now be made to the following detailed description of the preferred embodiments thereof, taken in conjunction with the accompanying drawings.

DESCRIPTION OF THE PREFERRED EMBODIMENTS

The preferred embodiments of the present invention will now be described with reference to FIGS. 1-25 of the drawings. Identical elements in the various figures are designated with the same reference numerals.

Figure 1:
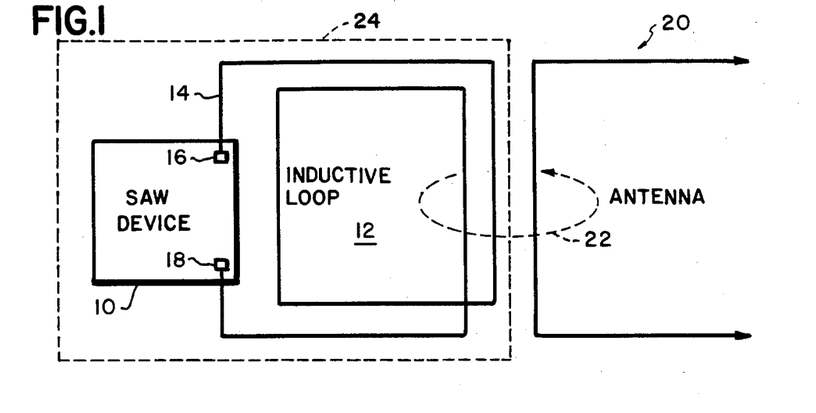
FIG. 1 is a representational diagram of the apparatus according to the present invention for coupling a SAW device to an antenna.

FIG. 1 illustrates the basic configuration of the present invention. As may be seen, a SAW device 10 which may serve as a transponder in a passive interrogator label system, is electrically connected to a inductive loop 12. In this example, the loop 12 is shown as comprising two turns of an electrical conductor 14, the opposite, free ends of which are connected, respectively to two terminals 16 and 18, respectively, of the SAW device.

The inductive loop is inductively coupled with an antenna 20. The magnetic flux coupling the antenna with the inductive loop 12 is indicated by the dash lines 22.

It will be understood that the SAW device 10 may also be directly electrically connected with the antenna 20. However, the use of the inductive loop 12 to inductively couple the SAW device 10 with the antenna 20 has the following advantages:

(1) The SAW device may be coupled with various different types of antennae without changing its standard package assembly. In particular, the SAW device and inductive loop, as outlined in dash lines 24, may be separately packaged and, if desired, hermetically sealed using mass production techniques.

(2) The SAW device 10 presents a relatively large capacitance at the electrical input/output terminals 16 and 18. This capacitance may be effectively compensated by the inductance of the loop 12, forming a tuned or resonant circuit in the frequency range of operation (e.g., in the range of 905–925 MHz). Moreover, the inductive loop provides a DC short circuit across the terminals 16 and 18. This short circuit prevents the build-up of static electricity across these terminals which, with the presence of moisture, can result in corrosion and degradation of the device.

(3) Inductive coupling according to the present invention makes it possible to couple the SAW device to various antenna configurations for which the SAW device would be otherwise unsuited, either due to mechanical difficulties in connecting the SAW device with an antenna or because of an impedance mismatch between the two. For example, the inductive loop makes it possible to conveniently couple the SAW device to an antenna formed by a slotted waveguide. Various types of slotted waveguide antennae are described hereinbelow.

Figure 2:
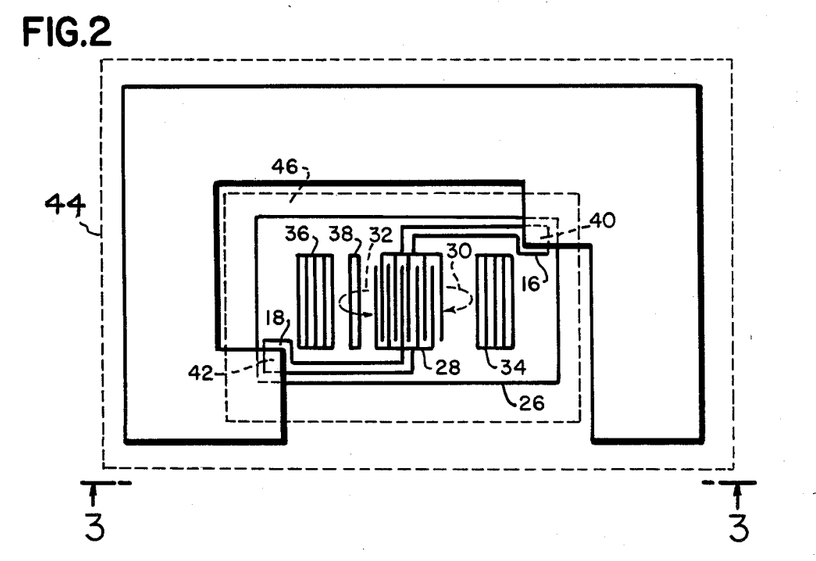
FIG. 2 is a top view of a typical SAW device connected to a single inductive loop formed of metal foil.
Figure 3:
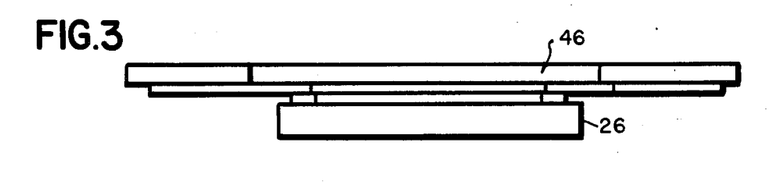
FIG. 3 is a side view of the structure shown in FIG. 2.

FIGS. 2 and 3 illustrate a typical SAW device electrically connected with a single turn of an inductive loop. The saw device includes a piezoelectric substrate 26, for example of lithium niobate, with at least one SAW transducer 28 deposited thereon. In the illustrated example, the transducer produces surface acoustic waves in opposite directions, indicated by the arrows 30 and 32, which are reflected back toward the transducer by reflectors 34 and 36, respectively. One or more delay pads 38 may be disposed between the transducer 28 and the respective reflector to selectively increase the delay of the returning SAW "echo", thereby to impart an informational code.

An electrical signal at a prescribed frequency, for example approximately 915 MHz, is therefore converted by the transducer 28 into acoustic wave energy; and the acoustic wave energy is thereafter reconverted into electrical energy by the transducer 28. Both the electrical energy applied to the transducer from the terminals 16 and 18, and the electrical energy reconverted by the transducer from the acoustic wave energy will be at the same operating frequency (e.g., about 915 MHz).

In this case, the inductive loop is formed by a single sheet of metal foil preferably about one mil thick. The foil may be made of aluminum, gold or gold-plated copper. The contact points 40 and 42 of the foil are directly bonded to the electrical terminals or contact pads 16 and 18, respectively, of the SAW device 10. If both the contact pads and the metal foil are made of aluminum, bonding is preferably effected by ultrasonic welding—e.g., by applying pressure and ultrasonic vibration with a bonding tool which welds together the two aluminum surfaces. If the contact pads have aluminum or gold surfaces and the leads have a gold contact surface, the lead-to-contact pad bond is preferably formed by thermal compression; i.e., by applying pressure and heat with the bonding tool.

The metal (e.g., aluminum) foil forming the inductive loop is mechanically bonded, in turn, to a substrate 44 formed by a Mylar sheet coated on both sides with a polyethylene based, thermally activated adhesive. The Mylar sheet may be four mils thick, for example, and the polyethylene coating, on each side of this sheet, may be about three mils thick. The aluminum foil is bonded to the polyethylene coated sheet by applying pressure and heating the aluminum foil to 125° C.

A polyethylene coated Mylar sheet of the type described is available from Transil Wrap, Inc., Chicago, Ill. This Mylar sheet is provided with a central opening 46 which is at least as large as the SAW device 10.

Figure 4:
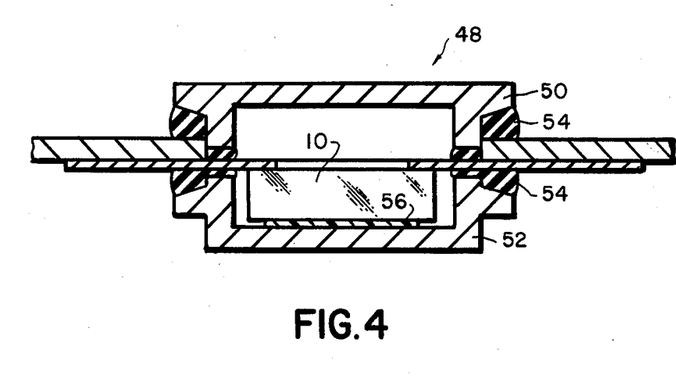
FIG. 4 is a cross-sectional view of a SAW device connected to a metal foil antenna and packaged within a small housing.

Referring to FIG. 4, the SAW device 10 may be encapsulated in a box-like container 48 formed by upper and lower container parts 50 and 52, respectively. In one preferred embodiment, these parts are made of plastic and are held together at their edges by an epoxy adhesive 54. The bottom surface of the SAW device 10 is attached to the inner surface of the lower part 52 by the same epoxy 56.

The epoxy adhesive may be obtained from Semi-Alloys in Mount Vernon, N.Y., under the designation "Epoxy 1040". The container 48 is preferably made of a plastic material available from General Electric Company under the registered trademark "Ryton".

If it is desired to hermetically seal the SAW device, the container may be made of an impervious material such as ceramic. In this case, a sealing glass must be used in place of the epoxy to bond and seal the two parts of the container together. Since known sealing glasses do not readily bond to aluminum, some other conductive metal, such as gold or gold-plated copper, is preferably used to form the electrical leads to the SAW device. In this case, it may be desirable to provide matching, e.g., gold, contact pads on the SAW device.

Figure 5:
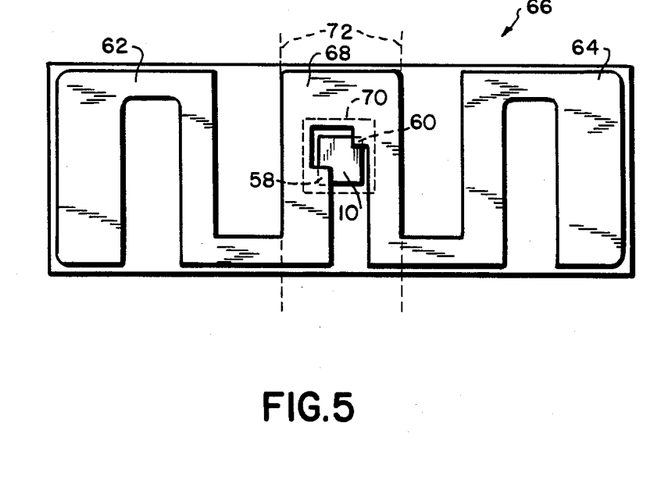
FIG. 5 is a top view showing a SAW device connected to a dipole antenna formed of metal foil bonded to a Mylar sheet.

FIG. 5 shows the SAW device 10 with its electric contact pads 58 and 60 connected to the electrical leads 62 and 64, respectively, which form opposing elements of a dipole antenna 66. The leads 62 and 64 are connected together by a contiguous section 68 which forms a DC short between the two antenna elements to prevent the build-up of static electricity.

The SAW device 10, connected with the antenna structure 66 may be encapsulated in the manner shown in FIG. 4 as indicated by the dashed lines 70. The structure, so formed, is capable of being mass produced, for example by techniques described in the aforementioned U.S. Patent application Ser. No. 793,703 filed Oct. 31, 1985 by Cin Smith and Donald Armstrong. In order to take advantage of such mass production techniques while replacing the dipole antenna 66 with a different type of antenna, the structure shown in FIG. 5 may be cut along the dashed lines 72 to leave a single loop of foil 68 connected to the terminals 58 and 60.

Figure 6:
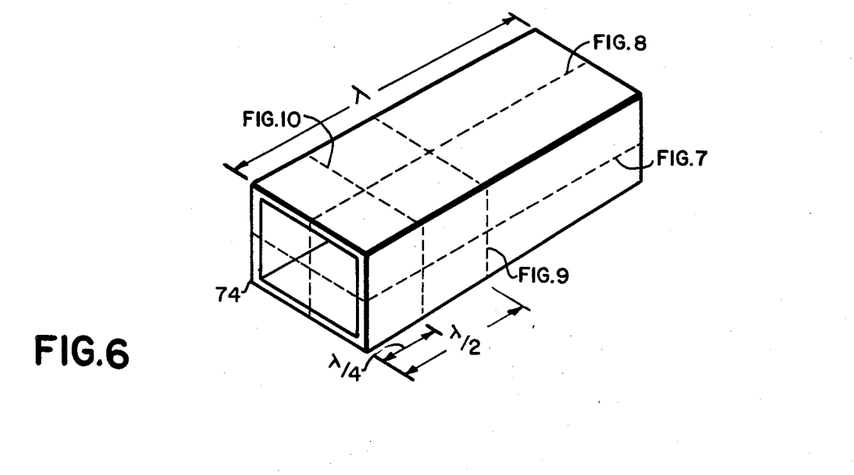
FIG. 6 is a representational diagram of a length or section of a rectangular waveguide.
Figure 7:
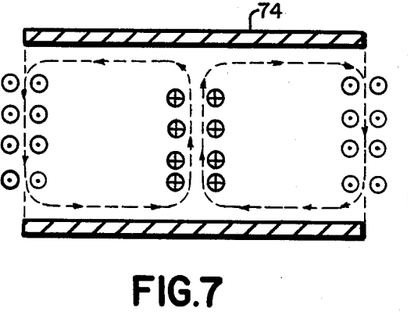
FIG. 7 is a representational diagram of a longitudinal slice through the waveguide of FIG. 6 showing the respective positions of the electric and magnetic fields in the $TE_{10}$ mode.
Figure 8:
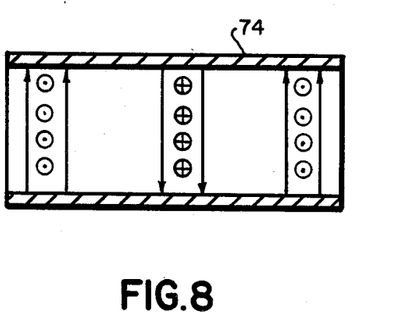
FIG. 8 is a representational diagram of another longitudinal slice through the waveguide of FIG. 6 showing the respective positions of the electric and magnetic fields.
Figure 9:
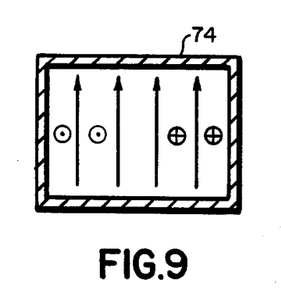
FIG. 9 is a representational diagram of a transverse slice through the waveguide of FIG. 6 showing the respective positions of the electric and magnetic fields.
Figure 10:
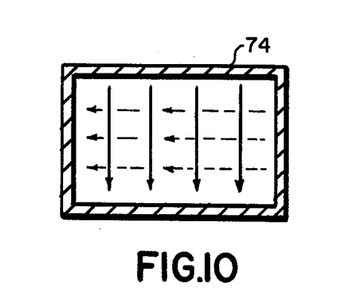
FIG. 10 is a representational diagram of another transverse slice through the waveguide of FIG. 6 showing the respective positions of the electric and magnetic fields.

FIG. 6 illustrates a rectangular waveguide 74 of length λ. This waveguide is essentially a rectangular hollow metal pipe that is dimensioned to support standing waves in the frequency range of operation.

The dashed lines in FIG. 6 indicate the positions of the cross-sectional views of FIGS. 7, 8, 9, and 10, respectively.

FIGS. 7–10 illustrate the relative positions and directions of the magnetic and electric fields for $TE_{10}$ mode which is the dominant mode for such a waveguide. The magnetic field is indicated in dashed lines; the electric field in solid lines.

Figure 11:
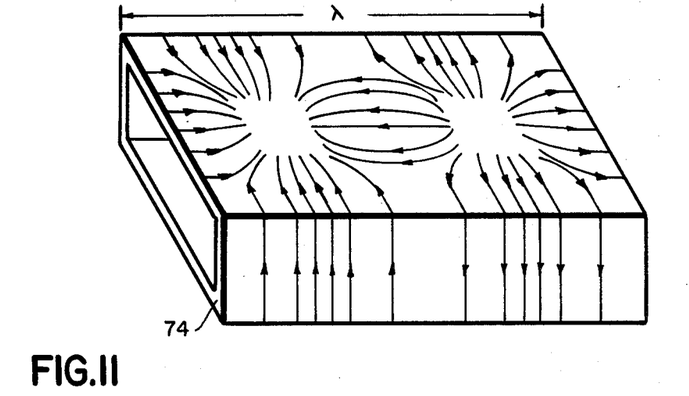
FIG. 11 is a representational diagram showing the alternating sheet current on the surface of the waveguide of FIG. 6.

FIG. 11 shows the sheet current which flows on the internal surfaces of the waveguide of FIG. 6. As with the diagrams of FIGS. 7–10, it must be remembered that the directions shown are "frozen" at an instant of time. In practice, this direction alternately reverses itself at the frequency of operation.

Figure 12:
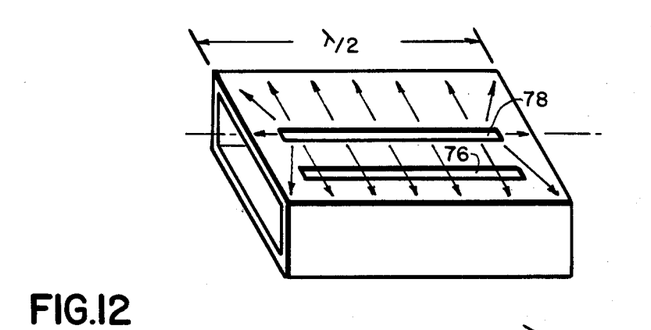
FIG. 12 is a representational diagram of a rectangular waveguide comprising a first, longitudinal slot aligned with the waveguide axis and a second, longitudinal slot which is displaced with respect to the axis.

FIG. 12 illustrates what occurs when a slot is cut in the surface of a waveguide on which a sheet current flows. If the slot is located in a position such as slot 76 which interrupts the sheet current, an electric potential is developed across the slot and radiation is produced in accordance with Maxwell's laws. If the slot is located so as not to interrupt current flow, as is the case with the slot 78 at the center of the waveguide in FIG. 12, no radiation is produced. The amount of radiation produced by the slot depends upon its location and width. Assuming that the wave mode is not perturbed by the presence of the slot, the farther the slot is from the center line (line of minimum surface current) the stronger will be its energy coupling by radiation. Also, the wider the slot is made, the stronger will be the energy coupling.

Figure 13:
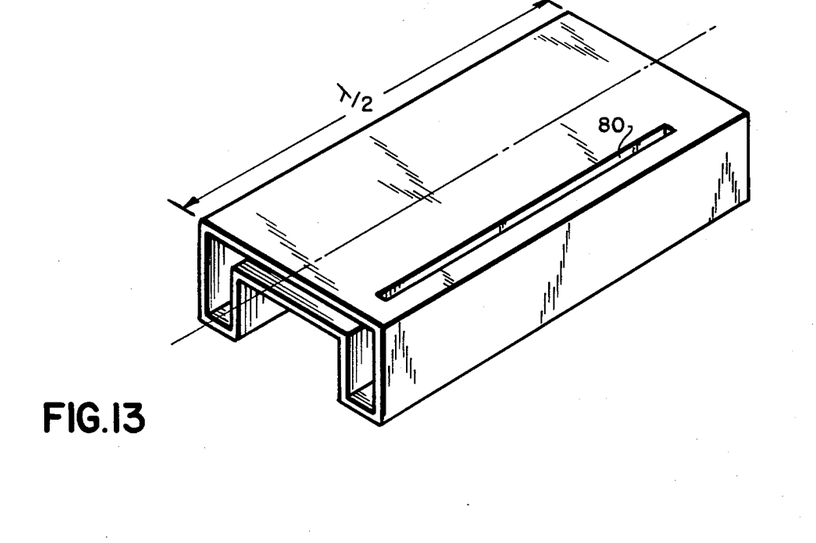
FIG. 13 is a perspective view of a rectangular ridged waveguide having a slot for transmitting and/or receiving radiation.
Figure 14A:
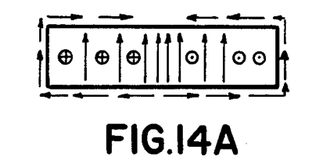
FIGS. 14A-14G are representational diagrams illustrating successive transitions of a waveguide from a rectangular shape to a ridged, circular shape.
Figure 14B:
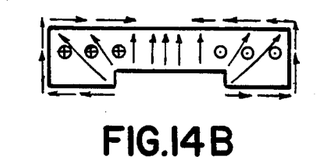
Figure 14C:
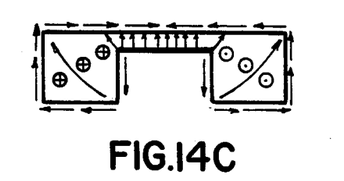
Figure 14D:
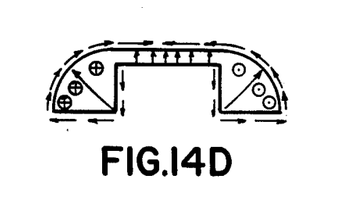
Figure 14E:
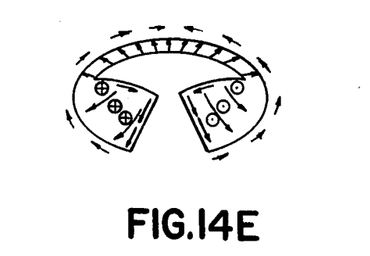
Figure 14F:
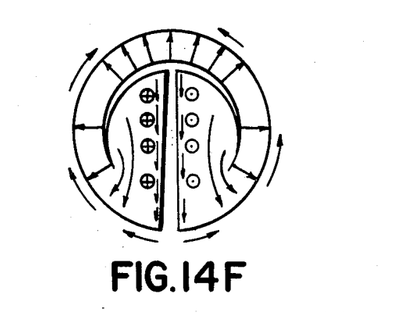
Figure 14G:
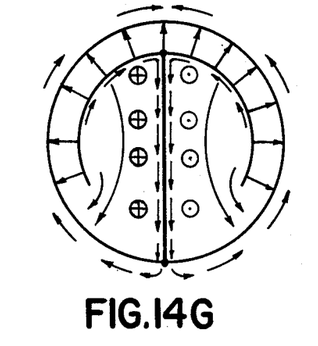

FIG. 13 illustrates a rectangular ridged waveguide of length $\lambda/2$ having a slot located in its upper surface between its center line and its outside edge. Such a waveguide serves as an antenna to transmit and receive radiation.

FIGS. 14A, 14B, 14C, 14D, 14E, 14F and 14G illustrate the locations and directions of the electric field, magnetic field and surface current in a rectangular waveguide as it evolves into a rectangular ridged waveguide and, finally, into a circular ridged waveguide. Note that while the surface current is shown on the outside of these waveguide cross-sections, this illustration is merely for diagram simplicity. The actual surface current is on the inside surfaces of the waveguides.

The long arrows in these figures represent the electric field, the short arrows the surface current and the arrow tails and heads (into and out of the paper) represent the magnetic field.

Figure 15:
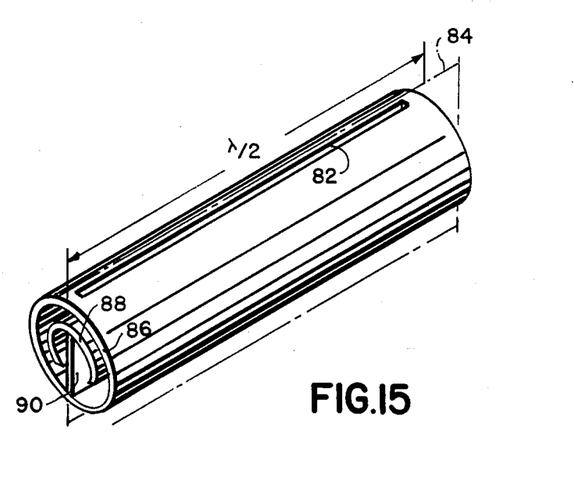
FIG. 15 is a perspective view of a circular, ridged waveguide having a slot for transmitting and/or receiving radiation.
Figure 16A:
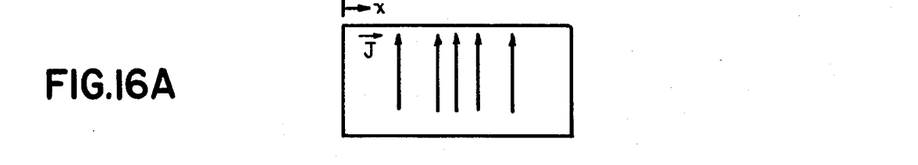
FIG. 16A is a representational, cross-sectional view of a rectangular waveguide showing the location of surface current.
Figure 16B:
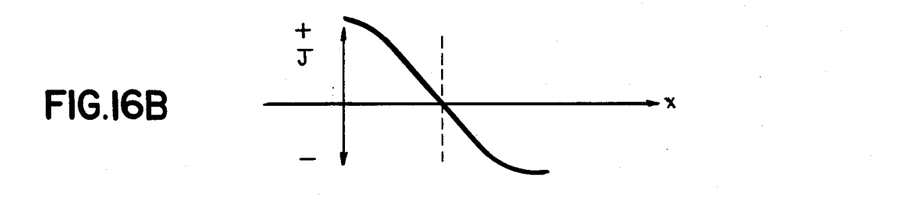
FIG. 16B is a diagram showing the magnitude and direction of the surface current in the waveguide of FIG. 16A.
Figure 17A:
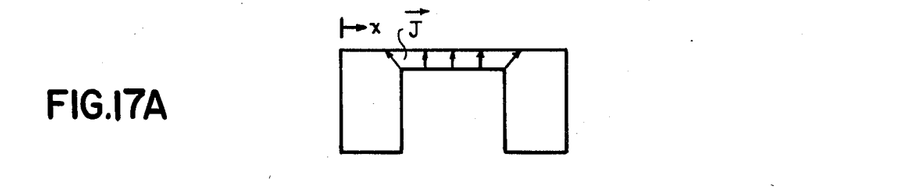
FIG. 17A is a representational, cross-sectional view of a rectangular, ridged waveguide showing the location of surface current.
Figure 17B:
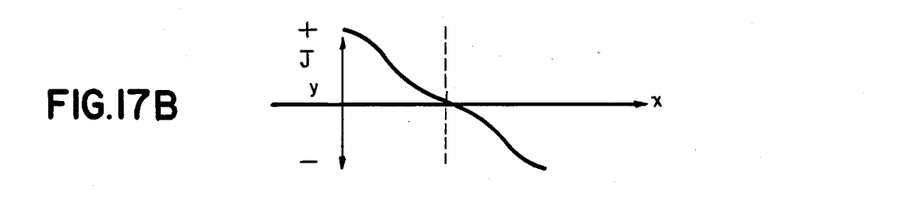
FIG. 17B is a diagram showing the magnitude and direction of the surface current in the waveguide of FIG. 17A.
Figure 18A:
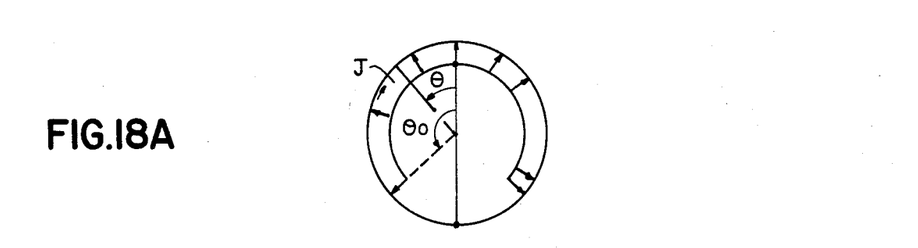
FIG. 18A is a representational, cross-sectional view of a circular, ridged waveguide showing the location of surface current.
Figure 18B:
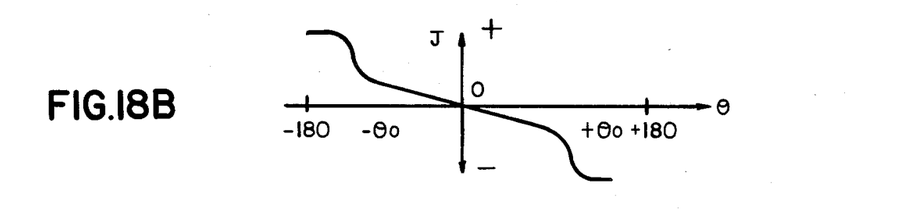
FIG. 18B is a diagram showing the magnitude and direction of the surface current in the waveguide of FIG. 18A.

FIG. 15 illustrates a slotted circular, ridged waveguide which may serve as an antenna to transmit and receive radiation. As noted above, the slot is positioned in such a way as to interrupt the surface current; however, the farther away the slot is located from the position of zero current, the more it will disturb and affect the waves in the cavity. Consequently, the slot 82 in the circular ridged waveguide of FIG. 15 is displaced only slightly from the principal plane 84 of the waveguide.

The principal parts of the circular, ridged waveguide are the "cap" or outer cylinder 86, the "ridge" 88 and the "web" 90.

FIGS. 16A, 16B, 17A, 17B, 18A, and 18B show the magnitude and direction of sheet current in a rectangular waveguide, a ridged rectangular waveguide, and a circular ridged waveguide, respectively, for the dominant wave mode. In all three cases, the surface current is zero at the central axis of the waveguide. In locating a slot on the waveguide to produce radiation, consideration is given to the magnitude of this surface current.

FIGS. 19A, 19B, 20A, 20B, 21A, and 21B illustrate three respective locations for an inductive loop which will effectively couple the loop to a waveguide. According to the present invention, the inductive loop is placed in a position along the waveguide where the magnetic field is highly concentrated. For example, this may be at the end of the central web in a circular ridged waveguide, or it may be at the end of a slot. In both instances, the magnetic field must go around the end of the web or slot, since it cannot pass through them. The field is therefore highly concentrated at these points.

Figure 19A:
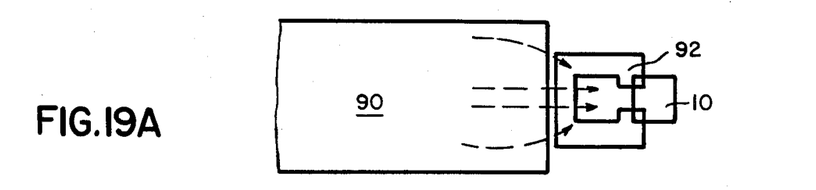
FIGS. 19A and 19B are side and top views, respectively, illustrating one preferred position of a inductive loop with respect to a waveguide element.
Figure 19B:
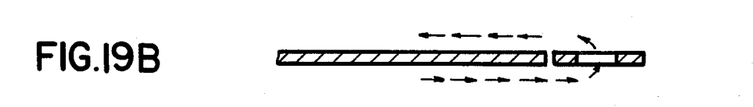
Figure 20A:
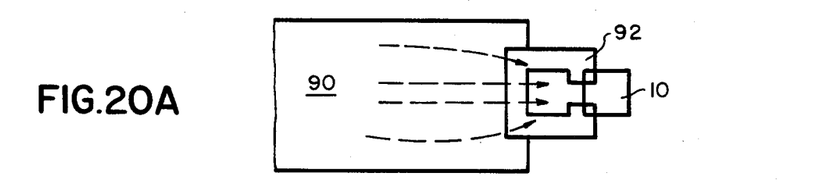
FIGS. 20A and 20B are side and top views, respectively, showing a second preferred position of a inductive loop with respect to a waveguide element.
Figure 20B:
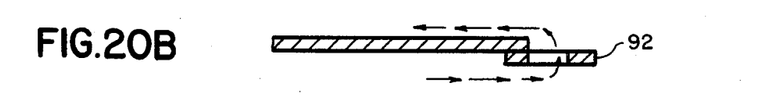
Figure 21A:
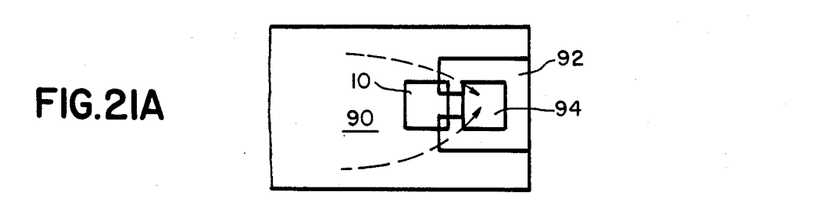
FIGS. 21A and 21B are side and top views, respectively, showing a third preferred position of a inductive loop with respect to a waveguide element.
Figure 21B:
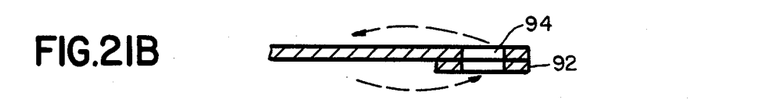

FIGS. 19A and 19B show the end of a web 90 of a circular ridged waveguide with an inductive loop 92 abutting this end. In this case, the magnetic flux lines pass from the side of the web 90 to the side of the loop 92 and then return through the central opening in the loop. Inductive coupling is effected because the flux lines are cut by the inductive loop as the magnetic field repeatedly collapses. FIGS. 20A and 20B show a similar configuration in which the inductive loop 92 somewhat overlaps the end of the web 90. In FIGS. 21A, and 21B the inductive loop 92 completely overlaps the end of the web 90. A hole is cut in the web 94 in a position which is in alignment with the central opening in the inductive loop. The magnetic field in the web is thus caused to pass through the loop.

The waveguide antenna according to the present invention is designed to provide a resonant cavity to support a standing wave. The waveguide may be either open or closed at each end, provided that it is reflective and forms standing waves at the frequency of operation.

With an open ended waveguide, the length of the waveguide is preferably $\lambda/2$ or about 6½ inches long at a frequency of about 915 MHz.

The length of a circular, ridged waveguide is determined by the length of its central web. The outer cap of the waveguide may extend beyond the length of the web and metal plugs may be placed at the ends of the cap to seal it.

FIGS. 22-25 illustrate a specific, preferred embodiment which is presently the best mode known for practicing the invention. In this embodiment, a circular ridged antenna, together with a SAW transponder and inductive loop, is embedded in a metal part 100 to provide identification for that part. The antenna 102 is a rolled and folded copper sheet made up of two separate halves. Each half begins with a key portion 104 that extends through a slot 106 in the metal part 100 from the exterior of this part to a cylindrical cavity 108 therein. The key portion 104 leads to an outer cylindrical cap portion 110 which is in contact with the metal member 100. The cap portion 110 extends in a semicircle to the opposite side from the key portion 104 and then bends back into a flat web portion 112. The web portion 112 does not extend the full diameter of the cavity 108 but, rather, terminates a selected distance from the cavity wall. At termination, it bends into an inner ridge portion 114 which extends back around concentrically with the outer cap 110. The ridge portion 114 terminates a selected distance from the web portion 112 (about 10° in circumferential angle).

Figures 23, 24, 25:
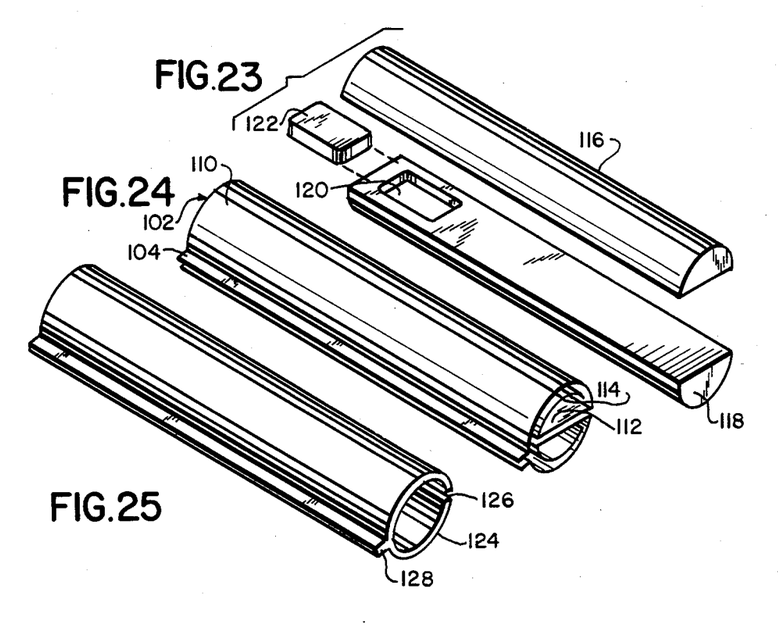
FIG. 23 is a perspective view illustrating the non-conductive elements contained in the antenna assembly of FIG. 22.
FIG. 24 is a perspective view illustrating the circular, ridged waveguide used in the antenna assembly of FIG. 22.
FIG. 25 is a perspective view of a non-conductive sleeve used in the antenna assembly of FIG. 22.

The other half of the antenna 102 is constructed in the same manner so that the web portions abut together as shown in FIG. 24. The two inner ridge portions extend around the antenna at an angular distance of about 340°. The ridge gap between the inner ridge and outer cap portions 114 and 110, respectively, is about 0.040 inches. The length of the antenna 102 is preferably 6.41 inches for operation in the range of 905-925 MHz.

Figure 22:
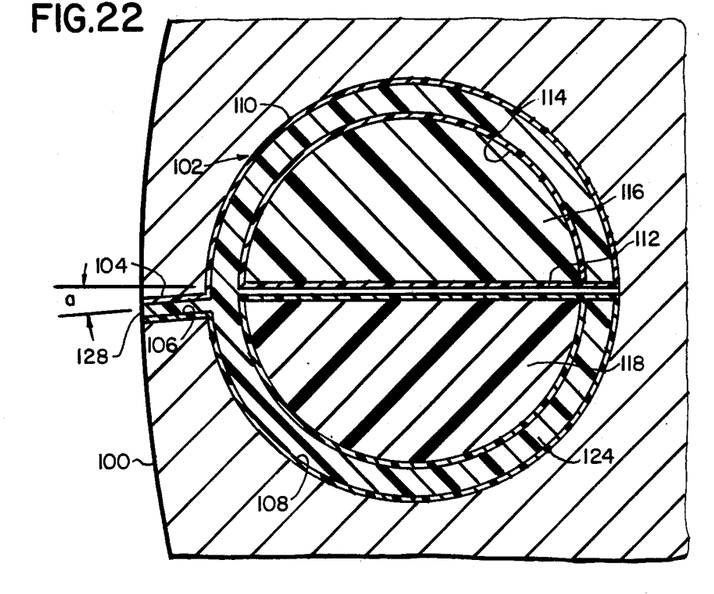
FIG. 22 is an enlarged, cross-sectional view of a circular, ridged waveguide antenna assembly, arranged within a metal jacket and having a slot for transmitting and/or receiving radiation.

As shown in FIG. 22, the slot formed by the key portions 104 is not located in the same plane as the web portions 112. Rather, the plane containing the web portions intersects the plane of the slot at an angle a of about 5°.

Referring now to FIG. 23, two nonconductive body halves 116 and 118 are located in the spaces between the web portions 112 and the inner ridge portions 114. These body halves are preferably made of Teflon which has a relatively high dielectric constant. A cavity 120 is formed in one body half 118 for receiving a module 122 comprising a SAW transponder and an inductive loop.

The inductive loop (not shown) is aligned with the plane of the web 112, with the central opening in the loop aligned with a corresponding opening (not shown) in the web 112 in the manner illustrated in FIGS. 21A and 21B.

FIG. 25 shows a nonconductive sleeve 124 which is arranged in the antenna between the inner ridge portion 114 and the outer cap 110. This nonconductive body is also preferably made of Teflon. The sleeve 124 has a longitudinal slot 126 to accommodate the web 112. A key 128, formed on the other side, is located within the antenna slot and separates the key portions 104 from each antenna half.

During assembly, the SAW device and inductive loop module is installed in the cavity 120 and the two nonconductive body halves 116 and 118 are inserted in the two respective metal antenna halves. These preassembled parts are then placed over the sleeve 124 and the assembled device is inserted into the cavity 108 in the metal member 100. Once inserted, the open end of the cavity which received the antenna may be closed and sealed by a plug.

There has thus been shown and described a novel inductive antenna coupling for a SAW device which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. Apparatus for coupling electrical energy into and/or out of a surface acoustic wave (SAW) device, such as a transponder, said SAW device having a piezoelectric substrate, at least one transducer arranged on said substrate for converting between electrical energy and SAW energy, and two input/output terminals electrically connected to said at least one transducer, said at least one transducer presenting to said terminals a prescribed capacitance at a given frequency range of operation, said apparatus comprising:
    (a) an inductive formed by at least one turn of an electrical conductor, the two free ends of said loop being electrically connected to said two terminals, respectively, and the inductance of said loop being substantially equal to said prescribed capacitance in said given frequency range; and
    (b) an antenna capable of receiving and/or transmitting radiation in said given frequency range, said antenna being inductively coupled to said loop, whereby said loop forms a protective DC short circuit across said two terminals and forms a resonant circuit with said SAW device in said given frequency range of operation.

2. The apparatus defined in claim 1, wherein said inductive loop comprises a single loop between said two terminals.

3. The apparatus defined in claim 2, wherein said inductive loop is formed by a layer of electrically conductive foil.

4. The apparatus defined in claim 3, further comprising a non-conductive substrate for supporting said conductive foil.

5. The apparatus defined in claim 1, wherein said given frequency range is in the microwave region, and wherein said antenna includes a resonant cavity for electric and magnetic fields in said given frequency range.

6. The apparatus defined in claim 5, wherein said antenna includes a waveguide configured and dimensioned to produce standing waves when excited in said given frequency range.

7. The apparatus defined in claim 6, wherein said waveguide has a length of $\lambda/2$, where $\lambda$ is the wavelength of the center frequency in said given frequency range.

8. The apparatus defined in claim 6, wherein said waveguide exhibits alternating sheet current on certain waveguide surfaces when excited in said given frequency range, and said waveguide includes an open slot at a position which interrupts said surface current, thereby to transmit or receive radiation in said given frequency range.

9. The apparatus defined in claim 6, wherein said loop is located at a position where the magnetic field formed in said waveguide is highly concentrated.

10. The apparatus defined in claim 6, wherein said waveguide is a rectangular waveguide.

11. The apparatus defined in claim 6, wherein said waveguide is a circular, ridged waveguide.

12. The apparatus defined in claim 11, wherein said circular, ridged waveguide includes a cylindrical cap, a partially cylindrical ridge member disposed concentrically within said cap, and a planar web connected between said ridge and said cap, and wherein said inductive loop is arranged substantially in the plane of said web.

13. The apparatus defined in claim 12, wherein said inductive loop abuts the end of said web.

14. The apparatus defined in claim 12, wherein said inductive loop partially overlaps the end of said web, such that the magnetic flux passing around said end of said web passes through the central opening in said inductive loop.

15. The apparatus defined in claim 12, wherein said inductive loop completely overlaps said web at one end of said web and wherein said web has an opening which is aligned with the opening in said inductive loop.

* * * * *